United States Patent
Friederich et al.

(10) Patent No.: US 6,811,622 B1
(45) Date of Patent: Nov. 2, 2004

(54) SEMIFINISHED AND FINISHED PRODUCTS MADE OF AUSTENITIC SPECIAL STEEL AND METHOD FOR THE PRODUCTION THEREOF

(76) Inventors: Heinrich Friederich, Beinstrasse 15, 68649 Gross-Rohrheim (DE); Reinhard Schmoock, Weingarten26, 57250 Netphen (DE)

(*) Notice: Subject to any disclaimer, the term of this patent is extended or adjusted under 35 U.S.C. 154(b) by 98 days.

(21) Appl. No.: 10/049,880

(22) PCT Filed: Aug. 17, 2000

(86) PCT No.: PCT/DE00/02800

§ 371 (c)(1),
(2), (4) Date: Jun. 26, 2002

(87) PCT Pub. No.: WO01/14600

PCT Pub. Date: Mar. 1, 2001

(30) Foreign Application Priority Data

| Aug. 19, 1999 | (DE) | 299 14 269 |
| Aug. 24, 1999 | (DE) | 299 14 802 |
| Sep. 15, 1999 | (DE) | 299 16 517 |
| Dec. 1, 1999 | (DE) | 299 21 121 |
| Dec. 12, 1999 | (DE) | 299 21 813 |

(51) Int. Cl.[7] .................. C22C 38/44; C22C 38/58; C21D 8/00; C21D 9/00
(52) U.S. Cl. ............. 148/326; 148/327; 148/607; 148/608; 148/639; 148/565; 148/567
(58) Field of Search .................. 148/326, 327, 148/607, 608, 639, 565, 567

(56) References Cited

U.S. PATENT DOCUMENTS

| 2,888,373 A | 5/1959 | Cherrie et al. |
| 5,286,153 A | 2/1994 | Sartor et al. |
| 6,338,600 B2 * | 1/2002 | Friederich et al. .......... 411/424 |

FOREIGN PATENT DOCUMENTS

| DE | 198 15 670 A1 | 11/1998 |
| DE | 299 14 269 U1 | 12/1999 |
| DE | 299 14 802 U1 | 1/2000 |
| EP | 0 545 852 B1 | 6/1993 |
| EP | 0 774 589 A1 | 5/1997 |
| GB | 1074576 | 7/1967 |

* cited by examiner

*Primary Examiner*—Deborah Yee
(74) *Attorney, Agent, or Firm*—Burns, Doane, Swecker & Mathis, L.L.P.

(57) ABSTRACT

The invention relates to semifinished and finished products made from special corrosion-resistant precipitation-hardened austenitic steel containing a large amount of intersticially dissolved nitrogen, comprising substantially smooth surfaces. The invention also relates to a method for producing corresponding semifinished and finished items. The aim of the invention is to produce semifinished and finished item and to provide an economical method for the production thereof, combining both solidity and resistance to corrosion. This is achieved by precipitation-hardening areas of the steel material.

14 Claims, 2 Drawing Sheets

Figure 1:
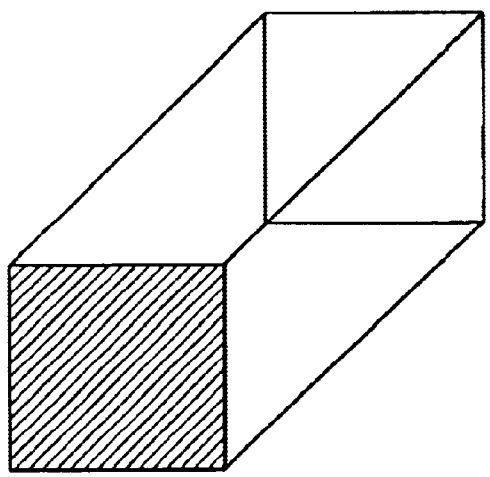

SEMIFINISHED AND FINISHED PRODUCTS MADE OF AUSTENITIC SPECIAL STEEL AND METHOD FOR THE PRODUCTION THEREOF

Priority

German Utility Patent No. 299 14 269 of 19 Aug. 1999
German Utility Patent No. 299 14 802 of 24 Aug. 1999
German Utility Patent No. 299 16 517 of 15 Sep. 1999
German Utility Patent No. 299 21 121 of 01 Dec. 1999
German Utility Patent No. 299 21 813 of 12 Dec. 1999

The present invention relates to semi-finished and finished products manufactured from corrosion-resistant precipitation hardenable austenitic special steel with a high content of interstitially dissolved nitrogen, with substantially smooth surfaces. The present invention also relates to a method for manufacturing corresponding semi-finished and finished products.

Within the framework of the present description, semi-finished and finished products with substantially smooth surfaces are understood as semi-finished and finished steel products, the dimensions of corresponding surface structures are to some extent comparable with the dimensions of the material itself, that is to say in particular with the thickness of the material, in contrast to components such as, for example, screws, which are to be considered as sharply notched components. In particular, in the case of the articles to which the present invention relates, corresponding structures are typically in the region of clearly more than 1 mm. The present invention mainly extends to profile parts and/or sheets, that is to say to parts having a substantially constant profile over their length, be this delimited by a circular, elliptic, polygonal or a more or less irregular contour. In the case of profiled rods, the material thickness should as a rule be more than 1 mm, and in the case of sheets more than 0.2 mm.

Many special steel components have great requirements placed upon them with respect to strength and corrosion resistance. Typical examples of such components are tension rods, tie rods, supports, pipes, sleeves, sheets, profiles with different cross-sections and so forth. Other components with variable cross-sections such as, for example, shafts, which have different, graduated diameters in some areas, have to satisfy great requirements with respect to corrosion resistance and strength. The present invention is directed towards such articles.

Semi-finished and finished products of this type made from austenitic corrosion-resistant special steel firstly generally obtain their strength by means of multiple cross-section reduction by cold rolling, selectively with or without intermediate solution annealing treatment. Lastly, for suitable components heat treatment in a furnace, a precipitation hardening, typically in a nitrogen atmosphere, takes place. There is, nevertheless the risk of chromium carbide precipitation, which leads to reduction of the corrosion resistance and increase in the risk of inter-crystalline corrosion. Moreover, heat treatment in the furnace inevitably causes precipitation hardening over the entire volume of material. A partial increase in the strength of specific component areas is thus not possible. Precipitation hardening in the furnace is extraordinarily time and cost-intensive, and increases the price of the corresponding products by several times as much.

Appropriate substances are described, for example, in European Patent No. 545 852 B1, and European Patent Application 774 589 A1.

The present application takes priority from German Utility Patent Nos. 299 14 269, 299 14 802, 299 16 517, 299 21 121 and 299 21 813, the contents of which are incorporated herein in their entirety by this reference to them.

A self-tapping screw made from corrosion-resistant material is known from DE-OS 198 15 670 that is inductively hardened in the lower cutting and thread area. With such screws, the hardened structures nevertheless form very fine and relatively thin-walled surface structures that have been subjected to a significant micro-structural change (work-hardening) in an earlier cold-working, so in this case inductive precipitation hardening found successful application as it was substantially limited to the threads only.

With respect to this prior art, the object of the present invention is to provide semi-finished and finished products and a method for their manufacture, that obtain a particularly advantageous combination of strength and corrosion-resistance with inexpensive manufacture.

This object is solved in that the steel material is precipitation hardened in a zone-wise manner.

Precipitation hardening is preferably done inductively, wherein alternatively laser irradiation is also conceivable.

The method for inductive precipitation hardening (or done by laser irradiation) has the substantial advantage that the areas and also the layer thickness within which precipitation hardening takes place can be completely, purposely selected. In this way strength and corrosion-resistance can be optimised by area, as generally the areas hardened by precipitation tend to be somewhat more susceptible to corrosion, but on the other hand have greater strength.

It has been shown, nevertheless, that inductive hardening is unexpectedly possible for the articles under discussion here, even though this appeared problematic for austenitic steels. This hardening method is possible in particular for austenitic steels with the composition (percentages by weight) set out in claim 4. Properties with respect to the combination of strength and corrosion-resistance are particularly advantageous when the ranges of composition according to claim 6 are followed. In the preferred variations the amounts of the components set out in detail in claims 4 and 5 respectively are coordinated with one another such that the remaining quantity of iron is between 65 and 68%.

By means of these alloy quantities, the steel obtains a good degree of corrosion-resistance, comparable with A2 qualities. The limiting of the nitrogen content corresponds to its natural solubility in austenitic, which increases with increased manganese content. Together with inductive precipitation hardening, the upper carbon content limit largely prevents formation of chromium carbide, which would preferably adapt itself to grain size, and lessens susceptibility to inter-crystalline corrosion.

The substance can be formed, in the manner usual for austenitic special steel alloys, by rolling or drawing into the desired final measurements, wherein in order to obtain the highest degree of strength, the course of fabrication has to be set out such that after the hot working or solution annealing treatment (solution annealing and quenching eliminates the hardening caused by cold working), cross-section reduction >40% by cold working has to be planned.

By means of this cold working, because of cold hardening and work-induced formation of martensite, strengths of Rm=1800 Mpa can occur.

Subsequent inductive precipitation treatment that is undertaken in the temperature range of 300° C.<T<550° C. leads to formation of intermetallic phases. These are mainly nitrides and/or to a small extent carbides, that lead to the desired increase in strength and hardness respectively, of up to 30%, in particular in the structural areas that have already been most greatly strengthened and transformed by mechanical working. Limitation of the corrosion properties is not to be expected.

This heat treatment alone (in addition to laser irradiation that also has to be home in mind) permits partial increase in strength in defined cross-section areas.

Because of the extremely short heat treatment times (several seconds), inductive precipitation hardening permits a clear price advantage compared to the components conventionally treated by several hours of furnace heating.

By means of the invention, articles with substantially smooth surfaces and a diameter greater than 1 mm are provided, that have both an advantageous raw material price—comparable with the known A2 qualities—with good corrosion-resistance properties, as well as selectively having a high degree of strength/hardness over the entire length or in some areas over the length or the cross-section.

With respect to the shapes and profile cross-sections, the articles according to the invention can vary in wide ranges. Profile parts in the shape of sheets, rods or also wires, that can be passed continuously through an inductive treatment are preferred.

Further advantages, features and possibilities for application of the present invention will be evident from the following description of preferred embodiments and the attached drawings.

Figure 2:
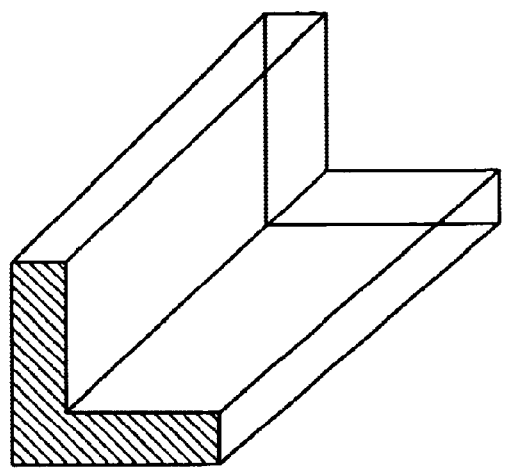
Figure 3:
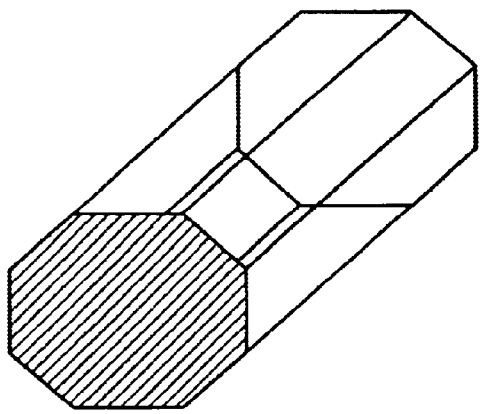
Figure 4:
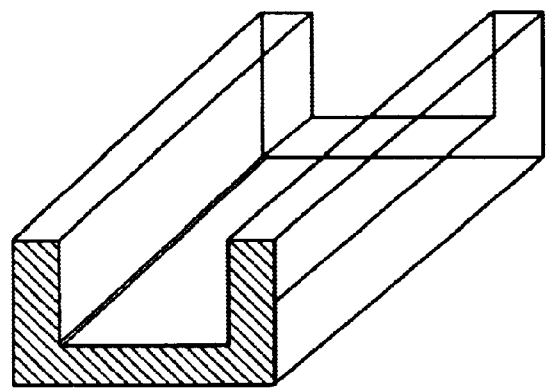
Figure 5:
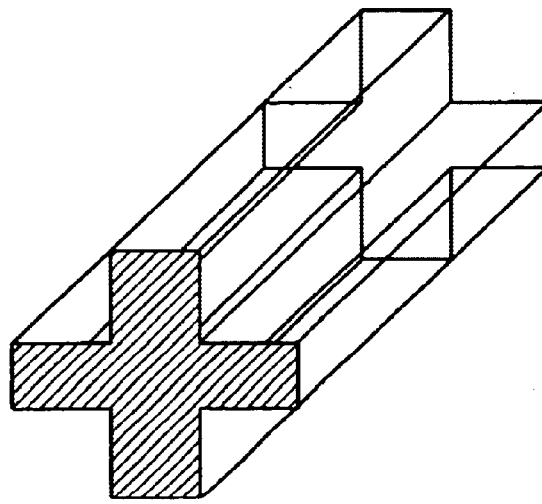
Figure 6:
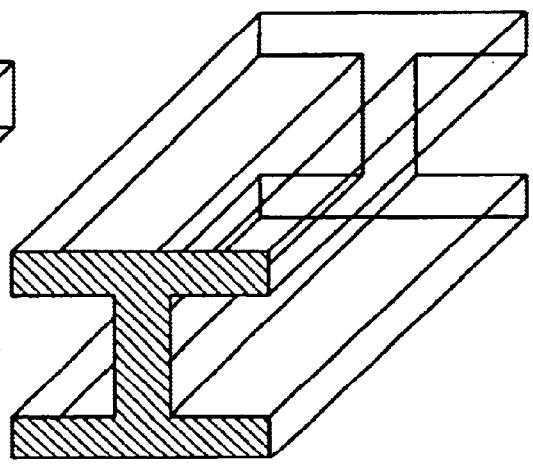

There is shown, in:

FIG. 1 a profile part with a quadratic cross-section,

FIG. 2 a profile part with L-shaped cross-section,

FIG. 3 a profile part with the cross-section of a regular octagon,

FIG. 4 a profile part with a U-shaped cross-section,

FIG. 5 a profile part with a cross-shaped cross-section,

FIG. 6 a profile part with a double T cross-section, and

Figure 7:
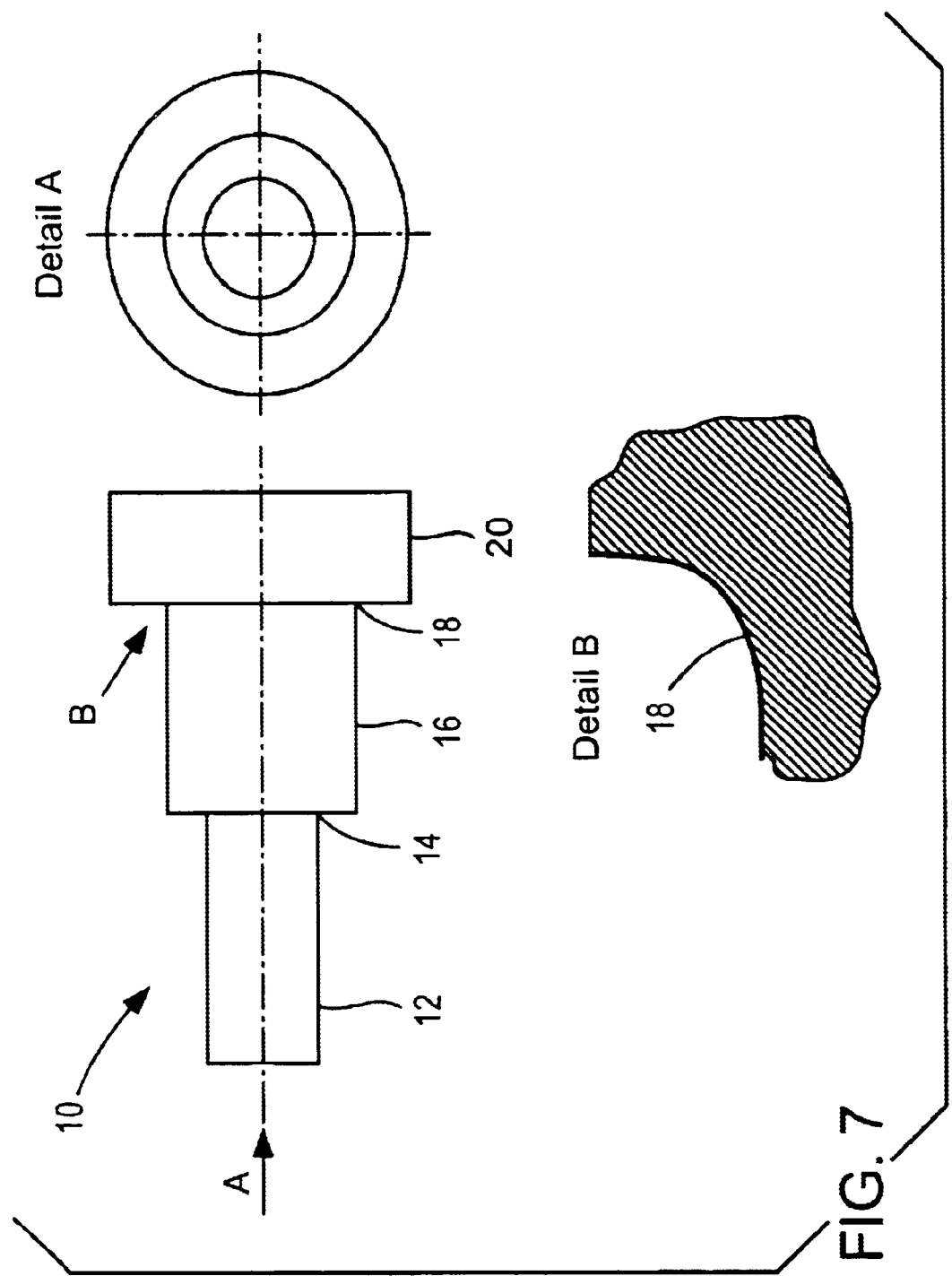

FIG. 7 different views of a shaft manufactured from the steel material according to the invention.

In FIGS. 1 to 6, different profile parts are shown that differ substantially in their cross-section, which however remain constant in the case of the respective profile part over their length, wherein the length of the profile parts can in principle, be as desired. For practical purposes, such profile parts typically have lengths of approximately 6 m, but if they are sufficiently flexible they can also be wrapped into rolls and are then transportable in significantly greater lengths. Clearly, hollow profiles such as, for example, pipes, with the greatest variation of cross-section shapes can also be manufactured with the features according to the invention.

In the case of the profile parts shown, the longitudinal edge, sharp corner areas can be more or less greatly rounded off. Precipitation hardening of the parts is done inductively and can thus be selectively limited to areas as desired, that is to say to different longitudinal sections and to different cross-section areas.

Hardening is preferably done in a surface layer, the total cross-section of which comprises between 1 and 50% of the total profile cross-section, or respectively the wall thickness of the steel material.

Inductive precipitation hardening of components of austenitic special steels reduces the heat treatment duration to the region of several seconds to a few minutes. This method—in contrast to overall treatment—offers the possibility of selectively increasing the strength/hardness of areas at risk of failure, while in remaining areas optimum toughness properties are retained.

What is claimed is:

1. Semi-finished and finished products in the form of sheets, profiles or shafts made of corrosion-resistant, precipitation hardenble, austenitic special steel with a high interstitially dissolved nitrogen content, with substantially smooth surfaces, wherein the steel material is precipitation hardened in a zoned manner, and the steel has a chemical composition comprising:

C 0.08–0.115%;
Mn 1.5–4%;
Mo 0.3–1.5%;
Cr 17.5–20%;
Ni 10–13%; and
N 0.2–0.5% wherein the remainder is substantially composed of iron.

2. Semi-finished and finished products according to claim 1, wherein the steel material is inductively precipitation hardened in a zoned manner.

3. Semi-finished and finished products according to claim 1, wherein they are at least partly hardened in a surface layer, wherein the thickness of the precipitation hardened layer is less than 50% of the material thickness measured perpendicular to the surface.

4. Semi-finished and finished products according to claim 1, wherein they are at least partly hardened in a surface layer, wherein the thickness of the precipitation hardened layer is less than 30% of the material thickness measured perpendicular to the surface.

5. Semi-finished and finished products according to claim 1, wherein they are at least partly hardened in a surface layer, wherein the thickness of the precipitation hardened layer is less than 10% of the material thickness measured perpendicular to the surface.

6. Semi-finished and finished products according to claim 1, wherein they are either sheets or profile rods with a substantially constant cross-section over their length.

7. Semi-finished and finished products according to claim 6, wherein the profile cross-section is circular, elliptical, quadratic, hexagonal, octagonal, L-shaped, cross-shaped, U-shaped or double T-shaped.

8. Semi-finished and finished products according to claim 7, wherein the steel material is a sheet or a plate with substantially constant material thickness.

9. Finished product according to claim 1, wherein it is a shaft with a diameter that varies along its axial length.

10. Method for manufacturing semi-finished and finished products from corrosion-resistant, precipitation hardenble austenitic special steel with a high interstitially dissolved nitrogen content, wherein a steel material with the following chemical composition is firstly manufactured:

C 0.082–0.115%;
Mn 1.5–4%;
Mo 0.3–1.5%;
Cr 17.5–20%;
Ni 10–13%; and
N 0.2–0.5% wherein the remainder is substantially composed of iron, in that the material worked in the still hot, or re-heated state into semi-finished and finished products with a substantially smooth surface, and as required can also be cold-worked, and in that subsequently a precipitation hardening treatment is undertaken that affects at the most a part of the volume of the semi-finished and/or finished products.

11. Method according to claim 10, wherein inductive precipitation hardening treatment is undertaken in a temperature range of 300° C. to 550° C.

12. Method according to claim 10, wherein inductive precipitation hardening treatment is undertaken such that the precipitation hardening only occurs in a surface layer with a layer thickness of 0.5 mm at the most.

13. Method according to claim 10, wherein the material is substantially endless material or rod material or respectively sheet material that is passed continuously through an induction apparatus.

14. Method according to claim 10, wherein instead of inductive treatment, precipitation hardening is done by laser irradiation.

* * * * *